United States Patent [19]
Kuhns

[11] Patent Number: 5,333,904
[45] Date of Patent: Aug. 2, 1994

[54] HEADER TRANSPORT SUPPORT BRACKET
[75] Inventor: Abe B. Kuhns, Arthur, Ill.
[73] Assignee: E-Z-Trail, Inc., Arthur, Ill.
[21] Appl. No.: 27,038
[22] Filed: Mar. 5, 1993
[51] Int. Cl.$^5$ ................................................ B60P 3/00
[52] U.S. Cl. .................................. 280/789; 280/145; 248/912; 410/54
[58] Field of Search ............... 280/789, 107, 143, 148, 280/145, DIG. 14; 248/912, 228; 410/52, 54, 72, 94, 67

[56] References Cited

U.S. PATENT DOCUMENTS

| | | | |
|---|---|---|---|
| 3,614,153 | 10/1973 | Tantlinger | 410/54 |
| 4,854,791 | 8/1989 | Brown | 410/54 |
| 4,925,349 | 5/1990 | Yurgevich | 410/54 |

FOREIGN PATENT DOCUMENTS 0291238 12/1986 Japan ..................................... 410/54

Primary Examiner—Margaret A. Focarino
Assistant Examiner—Victor E. Johnson
Attorney, Agent, or Firm—Lockwood, Alex, FitzGibbon & Cummings

[57] ABSTRACT

A transport for transporting combine headers and a support bracket therefor, wherein the support bracket includes a first support member to receive thereon and support the lower edge of the header when the lower edge defines a first geometric configuration, and a second support member having a different configuration than the first support member to receive thereon and support the lower edge of the header when the lower edge defines a second different geometric configuration. The second support member is pivotally mounted relative to the first support member to rotate between a first position away from the first support member to permit the first support member to receive and support the lower edge of the object having the first geometric configuration, and a second position in overlying relationship to the first support member to permit the second support member to receive and support the lower edge of the object having the second geometric configuration.

19 Claims, 2 Drawing Sheets

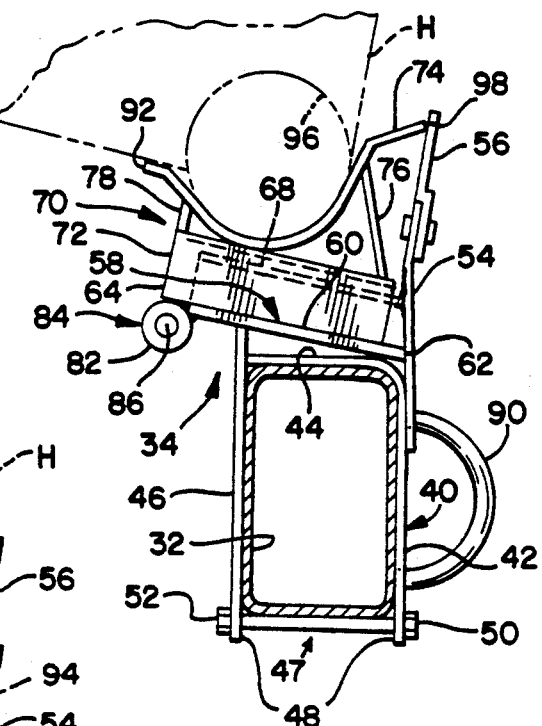
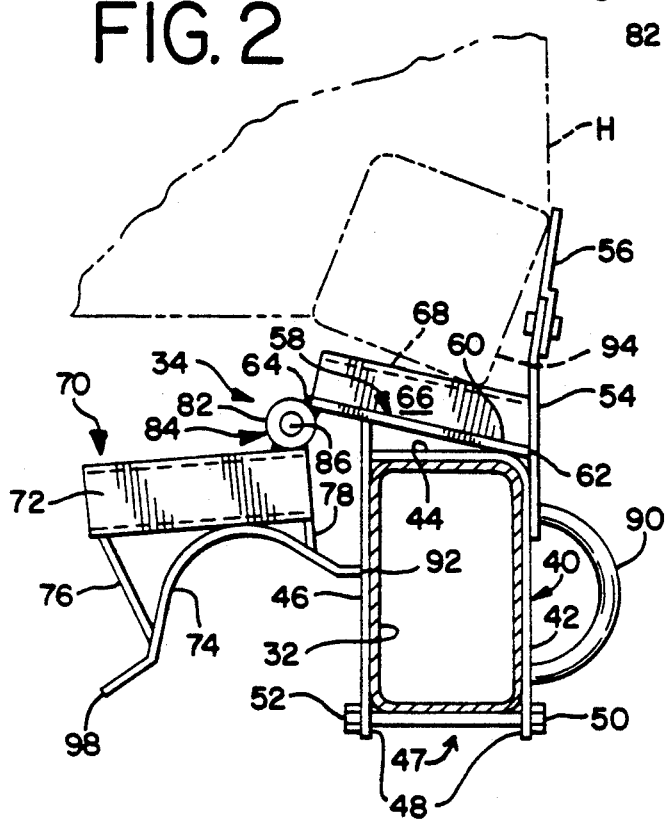
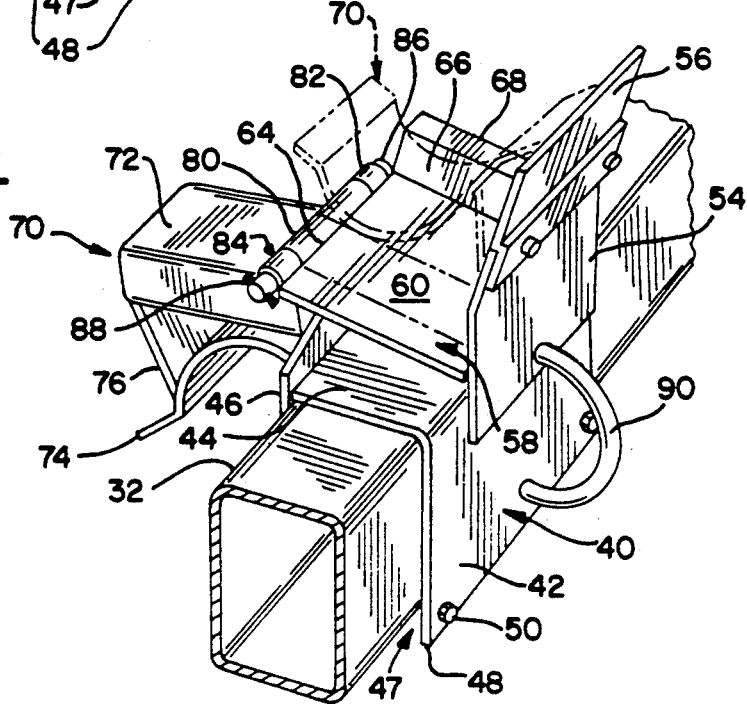

HEADER TRANSPORT SUPPORT BRACKET

BACKGROUND AND SUMMERY OF THE INVENTION

The present invention relates to a transport for transporting combine headers, such as corn, bean and grain headers or tables, and a support bracket therefor.

It is desirable to be able to detach the headers from combines to permit safe transit of the combine on public roadways. If the header is not detached from the combine, the overall combine assembly with its header typically would be too large to permit such safe transit. Accordingly, various transports have been known in the past to support the detached combine header and permit its transport separately from the combine. Such headers are of widely varying sizes and shapes depending upon their use, e.g. corn, bean or grain headers, and the identity of their manufacturer. Thus, the prior header transports have included adjustable mechanisms to permit the transport to be adjusted to accept the various shapes and sizes of headers which may need to be transported at different times.

These adjustable transport mechanisms have taken many structural forms and shapes from the very simple to the quite complex. In their simpler structural form adjustability is achieved by a multiplicity of brackets, bolts and holes which permit adjustment of header support rails or brackets on the chassis of the transport in both the horizontal transverse direction relative to the chassis and in vertical elevation to accommodate the various sizes and shapes of the headers. However, these simpler adjustment assemblies are usually capable of adjustment in only one direction at a time, i.e. either in the horizontal or vertical direction. Thus, although these adjustment mechanisms are structurally simple, in practice they are difficult and time consuming to adjust to fit the particular shape of the combine header to be transported due to the multiple individual and incremental adjustments which are needed in order to accommodate the transport support rails or brackets to fit the size and shape of the particular header. Moreover, because of the multiple adjustments required, adjustment becomes complex and two people are usually required to perform the necessary adjustments.

More structurally complex scissors-type assemblies have also been employed in the past for adjustment of the header support rails or brackets. However, these scissors-type assemblies also usually require the loosening, moving and tightening of a number of bolts and the performance of multiple steps in order to accomplish adjustment in both the horizontal and vertical directions. Again usually more then one person is needed to perform the complex adjustments. Moreover, the scissors-type assemblies, because of their scissoring action, can also be dangerous to the personnel making the adjustments, and these assemblies are frequently excessively high off the roadway resulting in instability during transport.

In my U.S. Pat. No. 5,040,825 an improved combine header transport is disclosed which overcomes the several disadvantages experienced in the aforementioned prior art header transports. In that patent an adjustable inclined bracket having a sloped surface thereon is disclosed which is mounted on one of the chassis rails of the transport chassis. The adjustable inclined support has the advantage that it may be easily and readily adjusted simultaneously in both the horizontal direction and in vertical elevation to adjust to the underside geometry of a wide range of differently configured combine headers which overlie the side of the chassis on which that bracket is positioned. Only simple brackets are disclosed in that Letters Patent on the other side of the chassis for supporting the underside of the other lower edge of the header.

The present invention is directed to an improvement in the latter mentioned brackets in which the bracket or brackets have the capability of receiving, accepting and firmly supporting the other lower edge of virtually all geometric configurations which currently exist on virtually all of the combine headers which are presently on the market or in use. By way of example, some combine headers have a framed lower edge which is generally round in cross-section, such as those which are currently offered by John Deere and Massey Ferguson. Other combine headers have a lower edge which is framed in a frame which is generally square or rectangular in cross-section such as are currently offered by Allis Chalmers. Also combine headers have been offered in the past by these or other companies which had no lower edge frame, but in which the housing itself presented a relatively squared external lower edge profile.

The header support bracket of the present invention is capable of accommodating all of these lower edge geometric configurations and shapes, and of providing firm support for the lower edge of those headers on a header transport, including a transport of the type disclosed in my aforementioned Letters Patent. Moreover, the support bracket of the present invention is simple in construction and may be rapidly and easily rigged and adjustable by a single person to receive and support any one of virtually all of the headers previously or currently available in the marketplace or in use.

In one principal aspect of the present invention, a transport for transporting a large bulky object having a support bracket thereon for supporting the lower edge of the object for transport, and the support bracket itself, includes a channel for mounting the bracket on a chassis rail of the transport vehicle. A first support member at the top of the channel is adapted to receive thereon and support the lower edge of the object when the lower edge defines a first geometric configuration. A flange extends upwardly from the channel and first support member and at an angle to the first support member to hold the lower edge of the object having the first geometric configuration against transverse movement when the edge is supported on the support member. A second support member having a different configuration than the first support member is adapted to receive thereon and support the lower edge of the object when the lower edge defines a second different geometric configuration. The second support member is pivotally mounted on a side of the channel opposite the flange to rotate between a first position away from the first support member to permit the first support member to receive and support the lower edge of the object having the first geometric configuration, and a second position in overlying relationship to the first support member to permit the second support member to receive and support the lower edge of the object having the second geometric configuration.

In another principal aspect of the present invention, the channel is substantially U-shaped in cross-section with the open end facing downwardly and away from the first support member, and the U-shaped channel has a pair of legs which straddle a chassis rail of the transport.

In still another principal aspect of the present invention, the height of the legs of the channel is greater than the height of the chassis rail upon which the bracket is mounted, so that the legs have a portion thereof which extends beyond the chassis rail. Fastening means extends between the extending portion of each of the legs and beneath the chassis rail to permit adjustment of the position of the bracket along the chassis rail upon which it is mounted.

In still another principal aspect of the present invention, the first support member is substantially linear in cross-section and the second support member is substantially semicircular in cross-section.

In still another principal aspect of the present invention, the second support member rests against the flange when it is rotated to the second position, and the second support member rests against the channel when it is rotated to the first position.

In still another principal aspect of the present invention, the first support member includes a substantially planar plate having a pair of spaced longitudinal edges. One of the edges is positioned adjacent the flange and the other edge has the pivotal mounting affixed thereto. At least one mounting flange extends upwardly from the planar plate for supporting the lower edge of the object when the second support member is rotated to the second position.

In still another principal aspect of the present invention, the chassis rail upon which the bracket is mounted extends longitudinally of the transport.

In still another principal aspect of the present invention, at least a pair of the brackets are spaced from each other on the longitudinally extending chassis rail.

In still another principal aspect of the present invention, the large bulky object is a combine header and the lower edge of the header is supported on either the first or second support members depending upon geometric configuration of the lower edge of the header.

These and other objects, features and advantages of the present invention will be more clearly understood through a consideration of the following detailed description.

BRIEF DESCRIPTION OF THE DRAWINGS

In the course of this description, reference will frequently be made to the attached drawings in which:

FIG. 2 is a cross-sectioned end elevation view of the support bracket, as viewed substantially along line 2—2 of FIG. 1, and showing the bracket rigged in a first position to accommodate the lower edge of a combine header having a substantially rectangular or square geometric configuration;

FIG. 3 is a cross-sectioned end elevation view of the support bracket as shown in FIG. 2, but showing the bracket rigged in a second position to accommodate the lower edge of a combine header having a substantially round geometric configuration; and FIG. 4 is a broken, perspective view of the bracket shown rigged in the first position in solid and in the second position in dot and dash.

DESCRIPTION OF THE PREFERRED EMBODIMENT

Figure 1:
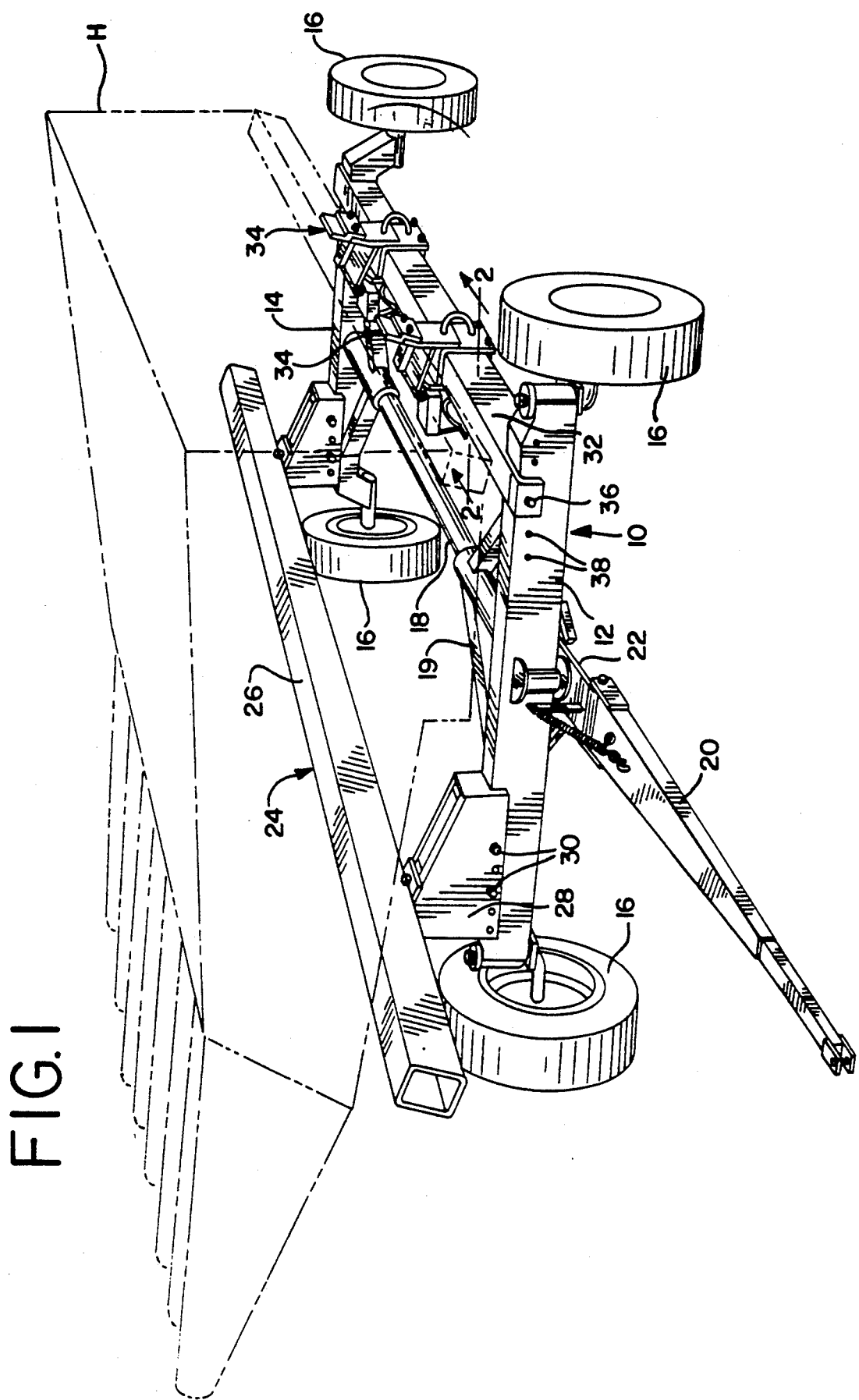
FIG. 1 is a perspective view of a combine header transport constructed in accordance with the principles of the present invention including a preferred embodiment of support bracket of the present invention, and showing the placement thereon of a typical combine header.

A preferred embodiment of combine header transport and support bracket therefor and constructed in accordance with the principles of the present invention is shown in FIG. 1.

The transport comprises a chassis, generally 10, having a pair of rails 12 and 14 which are longitudinally spaced from each other along the chassis and which extend transversely thereof. Wheels 16 are mounted at the end of the rails 12 and 14 at the four corners of the chassis by suitable and conventional mountings, including bearings and the like (not shown), to rollably support the chassis. The rails 12 and 14 are firmly coupled to each other by a center beam 18 to form the chassis frame for the transport. Although only a single center beam 18 is shown, it will be understood that more than one beam may be provided if desired. In the single beam construction shown, diagonal struts 19 are also preferably provided which extend between the center beam 18 and the front and rear rails 12 and 14 to strengthen the transport chassis frame.

A tongue 20 is also coupled to the front rail 12 by a tongue coupling assembly 22 which permits the tongue to both pivot and swivel relative to the rail 12. The tongue 20 may either be of fixed or adjustable length. The tongue may be attached either to the combine itself during transit or to a separate tractor to transport the header.

A header rest support, generally 24, is also mounted on and at one of the sides the chassis. This header support 24 supports the underside of the overlying portion of the header H, as shown in FIG. 1. The header support 24 is adapted to be adjusted in both the transverse horizontal direction and in vertical elevation, and preferably comprises a rail 26 also extending longitudinally of the chassis. The rail 26 is mounted on an inclined bracket 28 which, in turn, is mounted by bolts 30 which extend through holes in the rails 12 and 14. The header rest support 24 with its inclined brackets 28 do not form a principal aspect of this invention and are fully described in detail in my aforementioned U.S. Pat. No. 5,040,825, the disclosure of which is incorporated herein by reference.

A chassis rail 32 is also positioned to extend longitudinally of the chassis 10 between the front rail 12 and the rear rail 14. One or more of the header support brackets 34 which are the subject of this invention are provided for supporting the opposite lower edge of the header H. The rail 32 is preferably adjustably mounted to the rails 12 and 14 by bolts 36 which extend through one or more holes 38 in the rails 12 and 14, as best shown in FIG. 1, for transverse movement and adjustment of the rail 32 relative to the chassis.

Each of the support brackets 34 on the rail 32 are preferably identical in construction and, therefore, only one of the support brackets will be described in detail with the understanding that the description is equally relevant to the other support bracket.

With particular reference to FIGS. 2-4, the support bracket 34 comprises a channel 40 which is generally U-shaped in cross-section, and is formed by an angle having a longer downwardly extending leg 42 and a shorter top leg 44 which extends substantially horizontally from the leg 42. The channel 40 is preferably completed by a vertical plate 46 which is somewhat taller than leg 42 so that it extends above the upper surface of leg 44, as shown in FIGS. 2-4. Plate 46 is fixed to the longitudinal edge of leg 44, such as by welding. Thus, the generally U-shaped channel 40 is formed wherein the leg 42 and the leg defined by plate 46 are somewhat longer than the height of the longitudinal chassis rail 32, and so as to define an opening 47 in the channel which faces downwardly and away from the horizontal leg 44, and portions 48 at the bottom of the legs 42 and 46 which extend beneath the rail 32 as shown in FIGS. 2-4. Fasteners, such as bolts 50 having nuts 52 extend between the downwardly extending portions 48 of the channel 40 and beneath the rail 32 to permit tightening to secure the support bracket in its desired position along the longitudinal rail 32, or loosening to permit adjustment of the bracket position along the rail.

A plate is fixed to the outer face of leg 42, such as by welding, to define an upwardly extending flange 54 which extends upwardly from the channel 40 and, as shown in FIGS. 2-4, preferably at a slightly tilted angle from the vertical. The flange 54 may include a top piece 56 which is secured to the upper portion of the flange by suitable means, such as bolts and/or by welding. However, it will be understood that the flange 54 may be formed as one piece if desired.

A first support member 58 is fixed to the top of the channel 40. The first support member 58 preferably comprises a substantially planar plate 60 having a pair of spaced longitudinal edges 62 and 64, as shown in FIGS. 2-4. Edge 62 preferably abuts the flange 54 and is welded thereto. The underside of the plate 60 rests upon the top of plate 46 and is welded thereto, and because the plate 46 is somewhat taller than the elevation of the channel leg 44, plate 60 extends upward from the flange 54 and leg 44 at somewhat of an angle. This angle has a tendency to firmly seat the lower edge of the header H on the first support member 58. As shown in FIGS. 2-4, the plate 60 also has a support flange 66 which is preferably bent upwardly from an end of the plate and an outwardly extending support flange 68 which is bent outwardly from the top of flange 66. The ends of flanges 66 and 68 are preferably welded to the flange 54 to rigidify the first support member. Support flange 68 is adapted to receive the lower edge of a header H for support. Although in the preferred embodiment the flanges 66 and 68 are formed in integral one piece relationship to the planar plate 60, it will be understood that either or both of these flanges may be formed separately and welded together.

A second support member 70 comprises a base 72 which may be formed, by way of example, of a box channel. A curved shaped cradle plate 74 is fixed to the top of the base, such as by welding, and by welded support gusset plates 76 and 78 to rigidly support the cradle plate 74 on the base 72. An elongate hollow cylinder 80 is welded to the underside of the base 72, as best seen in FIG. 4, and short spaced hollow cylinders 82 are welded to the edge 64 of plate 60. The cylinders 80 and 82 when aligned define a hinge, generally 84, for pivotally and rotatably mounting the second support member 70 to the first support member 58. As in traditional hinges, the hinge 84 is completed by a hinge pin 86 which extends through the aligned hinge cylinders 80 and 82, and which preferably includes a radially extending pin 88 through an end thereof to prevent removal of the pin 86 from the hinge cylinders 80 and 82 during use, as best seen in FIG. 4.

A ring 90 may also be welded to the outer side of the support bracket 34, if desired, to provide a site for tie down of the header H when the header is positioned on the transport.

Although it is believed that the operation and function of the preferred embodiment of header support bracket which has thus far been described will be apparent to those skilled in the art from the foregoing description and the drawings, a brief description thereof will be described to follow.

The support bracket 34 is first mounted upon the longitudinal rail 32 of the transport chassis by dropping the channel 40 over the rail 32. Once the bracket 34 has been so mounted, it may be slidably adjusted along the rail 32 until it is positioned in its desired longitudinal position. At this time the bolts 50 and nuts 52 are tightened to secure the support bracket 34 in place.

In the event that the header H which is to be transported presents a lower bottom edge which is of generally square or rectangular configuration, the second support member 70 is rotated from the position shown in FIG. 3 to the inoperative position, as shown in FIG. 2, about the hinge 84. In this position an edge 92 of the cradle plate 74 preferably rests against the outside of plate 46 to minimize rattle of the second support member 70 during transport. Once the second support member 70 is rotated to its inoperative position, the first support member 58 is presented to receive and accept the lower edge of the header H for support thereon. As shown in FIG. 2, the lower edge defines a generally square or rectangular geometric configuration 94 which may be formed either by a squared frame or the squared edge of the combine housing itself where the frame is not exposed. This squared edge 94 is then brought to rest upon the outwardly extending support flange 68 and is firmly supported thereon. Transverse movement of the lower edge of the header H outward of the header support bracket 34 is prevented by the flange 54, as best seen in FIG. 2. The underside of the header H is supported at the other side of the chassis shown in FIG. 1 by the header rest support 24.

Where the lower edge of the header H is of a generally round or circular geometric configuration 96, as shown in FIG. 3, the second support member 70 is rotated about hinge 84 from its inoperative position, as shown in FIG. 2, to its operative position, as shown in FIG. 3. In this position the other edge 98 of the cradle plate 74 is preferably brought to rest against the flange 54, as shown in FIG. 3, and the underside of the base 72 rests upon the upper surface of the planar plate 60. The rounded lower edge 96 of the header H may now be securely positioned in the curvature of the cradle plate 74, as shown in FIG. 3, and firmly supported on the second support member 70.

It will be understood that the embodiment of the present invention which has been described is merely illustrative of one of the applications of the principles of the invention. Numerous modifications may be made by those skilled in the art without departing from the true spirit and scope of the invention.

I claim:

1. A support bracket for supporting a lower edge of a large bulky object for transport of the object comprising:

a channel for mounting the bracket on a chassis rail of a transport vehicle, said channel having a top;

a first support member at the top of said channel and adapted to receive thereon and support the lower edge of the large bulky object when the lower edge defines a first geometric configuration;

a flange extending upwardly from said channel and first support member and at an angle to said first support member to hold the lower edge of the large bulky object of the first geometric configuration against transverse movement when the edge is supported on said support member;

a second support member having a different configuration than said first support member and adapted to receive thereon and support the lower edge of the large bulky object when the lower edge defines a second geometric configuration which is different than said first geometric configuration, and pivotal mounting means on a side of said channel opposite said flange for mounting said second support member to rotate between a first position away from said first support member to permit said first support member to receive and support the lower edge of the large bulky object having said first geometric configuration, and a second position in overlying relationship to said first support member to permit said second support member to receive and support the lower edge of the large bulky object having said second geometric configuration.

2. The bracket of claim 1, wherein said channel is substantially U-shaped in cross-section so as to define an open end facing downwardly and away from said first support member.

3. The bracket of claim 1, wherein said first support member is substantially linear in cross-section and said second support member is substantially semicircular in cross-section.

4. The bracket of claim 1, wherein said second support member rests against said flange when rotated to said second position.

5. The bracket of claim 4, wherein said second support member rests against said channel when rotated to said first position.

6. The bracket of claim 1, wherein said second support member rests against said channel when rotated to said first position.

7. The bracket of claim 1, wherein said first support member comprises a substantially planar plate having a pair of spaced longitudinal edges, one of said edges being positioned adjacent said flange, the other of said edges having said pivotal mounting means affixed thereto, and at least one mounting flange extending upwardly from said planar plate for supporting the lower edge of the large bulky object when said second support member is rotated to said second position.

8. A transport for transporting a large bulky object, the transport having a chassis on wheels for rollably supporting the chassis, the chassis being formed of rails including a pair of rails spaced from each other and first and second support means transversely spaced from each other to support transversely spaced portions of the object to be transported when the object is placed on the chassis, wherein the improvement in at least one of said support means comprises at least one support bracket on one of the rails which form the chassis, said bracket comprising:

a channel for mounting the bracket on said one of said rails of the transport, said channel having a top;

a first support member at the top of said channel and adapted to receive thereon and support the lower edge of the object when the lower edge defines a first geometric configuration;

a flange extending upwardly from said channel and first support member and at an angle to said first support member to hold the lower edge of the object of the first geometric configuration against transverse movement when said edge is supported on the support member;

a second support member having a different configuration than said first support member and adapted to receive thereon and support the lower edge of the object when the lower edge defines a second geometric configuration which is different than said first geometric configuration; and pivotal mounting means on a side of said channel opposite said flange for mounting said second support member to rotate between a first position away from said first support member to permit said first support member to receive and support the lower edge of the object having said first geometric configuration, and a second position in overlying relationship to said first support member to permit said second support member to receive and support the lower edge of the object having said second geometric configuration.

9. The transport of claim 8, wherein said channel is substantially U-shaped in cross-section so as to define an open end facing downwardly and away from said first support member, and said U-shaped channel has a pair of legs which straddle said one of said rails.

10. The transport of claim 9, wherein the height of said legs is greater than the height of the chassis rail upon which said bracket is mounted, whereby the legs have a portion thereof which extends beyond the chassis rail, and fastening means extending between the extending portion of each of the legs and beneath the chassis rail, whereby the position of said bracket may be slidably adjusted along the chassis rail upon which it is mounted.

11. The transport of claim 8, wherein said first support member is substantially linear in cross-section, and said second support member is substantially semicircular in cross-section.

12. The transport of claim 8, wherein said second support member rests against said flange when rotated to said second position.

13. The transport of claim 12, wherein said second support member rests against said channel when rotated to said first position.

14. The transport of claim 8, wherein said second support member rests against said channel when rotated to said first position.

15. The transport of claim 8, wherein said first support member comprises a substantially planar plate having a pair of spaced longitudinal edges, one of said edges being positioned adjacent said flange, the other of said edges having said pivotal mounting means affixed thereto, and at least one mounting flange extending upwardly from said planar plate for supporting the lower edge of the object when said first support member is rotated to said second position.

16. The transport of claim 8, wherein said rail upon which said bracket is mounted extends longitudinally of said transport.

17. The transport of claim 16, including at least a pair of said brackets spaced from each other on said longitudinally extending rail.

18. The transport of claim 16, including adjustable mounting means mounting said longitudinally extending rail for transverse movement relative to the chassis.

19. The transport of claim 8, wherein the large bulky object is a combine header, and wherein the lower edge of the header is supported on either said first or second support members depending upon the geometric configuration of the lower edge of the header.

* * * * *

UNITED STATES PATENT AND TRADEMARK OFFICE
CERTIFICATE OF CORRECTION

PATENT NO. : 5,333,904
DATED : August 2, 1994
INVENTOR(S) : Abe B. Kuhns

It is certified that error appears in the above-indentified patent and that said Letters Patent is hereby corrected as shown below:

Col. 8, line 61, "first" should read --second--; line 62, "second" should read --first--.

Signed and Sealed this

Twenty-eight Day of March, 1995

Attest:

BRUCE LEHMAN

Attesting Officer     Commissioner of Patents and Trademarks